US009961651B2

(12) United States Patent
Yang et al.

(10) Patent No.: US 9,961,651 B2
(45) Date of Patent: May 1, 2018

(54) MULTI-CHANNEL POWER CONTROL

(75) Inventors: Rongzhen Yang, Shanghai (CN); Jong-Kae Fwu, Sunnyvale, CA (US); Hujun Yin, Saratoga, CA (US)

(73) Assignee: INTEL CORPORATION, Santa Clara, CA (US)

( * ) Notice: Subject to any disclaimer, the term of this patent is extended or adjusted under 35 U.S.C. 154(b) by 716 days.

(21) Appl. No.: 13/992,594

(22) PCT Filed: Aug. 17, 2012

(86) PCT No.: PCT/CN2012/080292
§ 371 (c)(1),
(2), (4) Date: Apr. 29, 2014

(87) PCT Pub. No.: WO2014/026373
PCT Pub. Date: Feb. 20, 2014

(65) Prior Publication Data
US 2014/0233445 A1 Aug. 21, 2014

(51) Int. Cl.
*H04W 52/38* (2009.01)
*H04W 72/04* (2009.01)
*H04W 52/34* (2009.01)
*H04W 52/50* (2009.01)
*H04W 52/14* (2009.01)

(52) U.S. Cl.
CPC ......... *H04W 52/38* (2013.01); *H04W 52/146* (2013.01); *H04W 52/34* (2013.01); *H04W 52/346* (2013.01); *H04W 52/50* (2013.01); *H04W 72/0473* (2013.01)

(58) Field of Classification Search
CPC ... H04W 52/38; H04W 52/34; H04W 52/146; H04W 52/50; H04W 52/346; H04W 72/0473
See application file for complete search history.

(56) References Cited

U.S. PATENT DOCUMENTS

2010/0210243 A1* 8/2010 Vujcic ................. H04B 1/7073
                                                        455/411
2013/0035084 A1* 2/2013 Song ................... H04W 74/0833
                                                        455/418

FOREIGN PATENT DOCUMENTS

| CN | 101488789 A | 7/2009 |
| EP | 1198076 A1 | 4/2002 |
| WO | 2010/091425 A2 | 8/2010 |

(Continued)

OTHER PUBLICATIONS

Extended European Search Report dated Jun. 1, 2016 from European Patent Application No. 12882905.8, 16 pages.

(Continued)

*Primary Examiner* — Thai Nguyen
(74) *Attorney, Agent, or Firm* — Schwabe, Williamson & Wyatt, P.C.

(57) ABSTRACT

Embodiments of computer-implemented methods, systems, computing devices, and computer-readable media are described herein for assigning transmission power to one or more components carriers in an uplink transmission utilizing carrier aggregation. In one embodiment, power is assigned to a component carrier based on the priority level of the component carrier. In another embodiment, power is assigned based on absolute priority order. In yet another embodiment, power is assigned based on relative priority order.

14 Claims, 6 Drawing Sheets

(56) References Cited

FOREIGN PATENT DOCUMENTS

WO   WO2012/091425 A2   8/2010
WO   2011120716 A1   10/2011

OTHER PUBLICATIONS

International Search Report and Written Opinion dated May 16, 2013 from International Application No. PCT/CN2012/080292.
3GPP, "LS on Parallel transmissions of PRACH and PUSCH/PUCCH/SRS," 3GPP TSG RAN WG1 Meeting #68, R1-120005, Feb. 6-10, 2012, Dresden, Germany, 1 page.
3GPP, "Draft LS reply on parallel transmissions of PRACH and PUSCH/PUCCH/SRS," 3GPP TSG RAN WG1 Meeting #68, R1-120010, Feb. 6-10, 2012, Dresden, Germany, 1 page.
Huawei, Hisilicon, "Consideration on parallel transmissions of PRACH and PUSCH/PUCCH/SRS," 3GPP TSG WG1 Meeting #68, R1-120011, Feb. 6-10, 2011, Dresden, Germany, 4 pages.
Ericsson, St-Ericsson, "Power scaling due to multiple TA values," 3GPP TSG-RAN WG1 #68, R1-120075, Feb. 6-10, 2012, Dresden, Germany, 4 pages.
Catt, "UL power control with multiple timing advances in Rel-11," 3GPP TSG RAN WG1 Meeting #68, R1-120093, Feb. 6-10, 2012, Dresden, Germany, 4 pages.
Huawei, Hisilicon, "Discussion on UL control signalling transmission with multiple TAs," 3GPP TSG RAN WG1 Meeting #68, R1-120123, Feb. 6-10, 2012, Dresden, Germany, 3 pages.
Panasonic, "Discussion on LS on Parallel transmissions of PRACH and PUSCH/PUCCH/SRS," 3GPP TSG-RAN Meeting #68, R1-120217, Feb. 6-10, 2012, Dresden, Germany, 2 pages.
Panasonic, "Simultaneous transmissions in multiple TA," 3GPP TSG-RAN WG1 Meeting #68, R1-120221, Feb. 6-10, 2012, Dresden, Germany, 4 pages.
ZTE, "Discussion of parallel transmissions of PRACH on SCell and UL transmissions on other cell(s)," 3GPP TSG WG1 Meeting #68, R1-120287, Feb. 6-10, 2012, Dresden, Germany, 4 pages.
3GPP, "Technical Specification Group Radio Access Network; Evolved Universal Terrestrial Radio Access (E-UTRA); Physical layer procedures (Release 10)," 3GPP TS 36.213 V10.6.0, Jun. 26, 2012, Lte Advanced, 125 pages.
Pantech, "Simultaneous transmission in multiple TA," 3GPP TSG RAN1 #68, R1-120318, Feb. 6-10, 2012, Dresden, Germany, 3 pages.
NTT Docomo, "Parallel Transmissions for PRACH on SCell," 3GPP TSG RAN WG1 Meeting #68, R1-120396, Feb. 6-10, 2012, Dresden, Germany, 2 pages.
LG Electronics, "Simultaneous transmissions in multiple TA groups," 3GPP TSG RAN WG1 #68, R1-120424, Feb. 6-10, 2012, Dresden, Germany, 9 pages.
Texas Instruments, "Physical layer aspects of multiple timing advance commands," 3GPP TSG RAN WG1 #68, R1-120462, Feb. 6-10, 2012, Dresden, Germany, 5 pages.
Alcatel-Lucent et al., "Discussion on parallel transmissions of PRACH and PUSCH/PUCCH/SRS," 3GPP TSG RAN WG1 #68, R1-120474, Feb. 6-10, 2012, Dresden, Germany, 3 pages.
Alcatel-Lucent et al., "Power scaling for simultaneous transmissions of multiple UL channels with multiple TA groups," 3GPP TSG RAN WG1 #68, R1-120486, Feb. 6-10, 2012, Dresden, Germany, 4 pages.
QUALCOMM Incorporated, "SRS operation in multiple TA offset CA," 3GPP TSG RAN WG1 #68, R1-120539, Feb. 6-10, 2012, Dresden, Germany, 4 pages.
QUALCOMM Incorporated, "Power control aspects of multiple TA operation," 3GPP TSG RAN WG1 #68, R1-120540, Feb. 6-10, 2012, Dresden, Germany, 3 pages.
NTT Docomo, "UL Simultaneous Transmissions for Multiple TA," 3GPP TSG RAN WG1 Meeting #68, R1-120400, Feb. 6-10, 2012, Dresden, Germany, 4 pages.
Partial Supplementary European Search Report dated Feb. 15, 2016 from European Patent Application No. 12882905.8, 7 pages.
Article 94(3) issued May 10, 2017 from European Patent Application No. 12882905.8, 5 pages.
First Office Action dated Jul. 11, 2017 from Chinese Patent Application No. 201280074748.5, 26 pages.

* cited by examiner

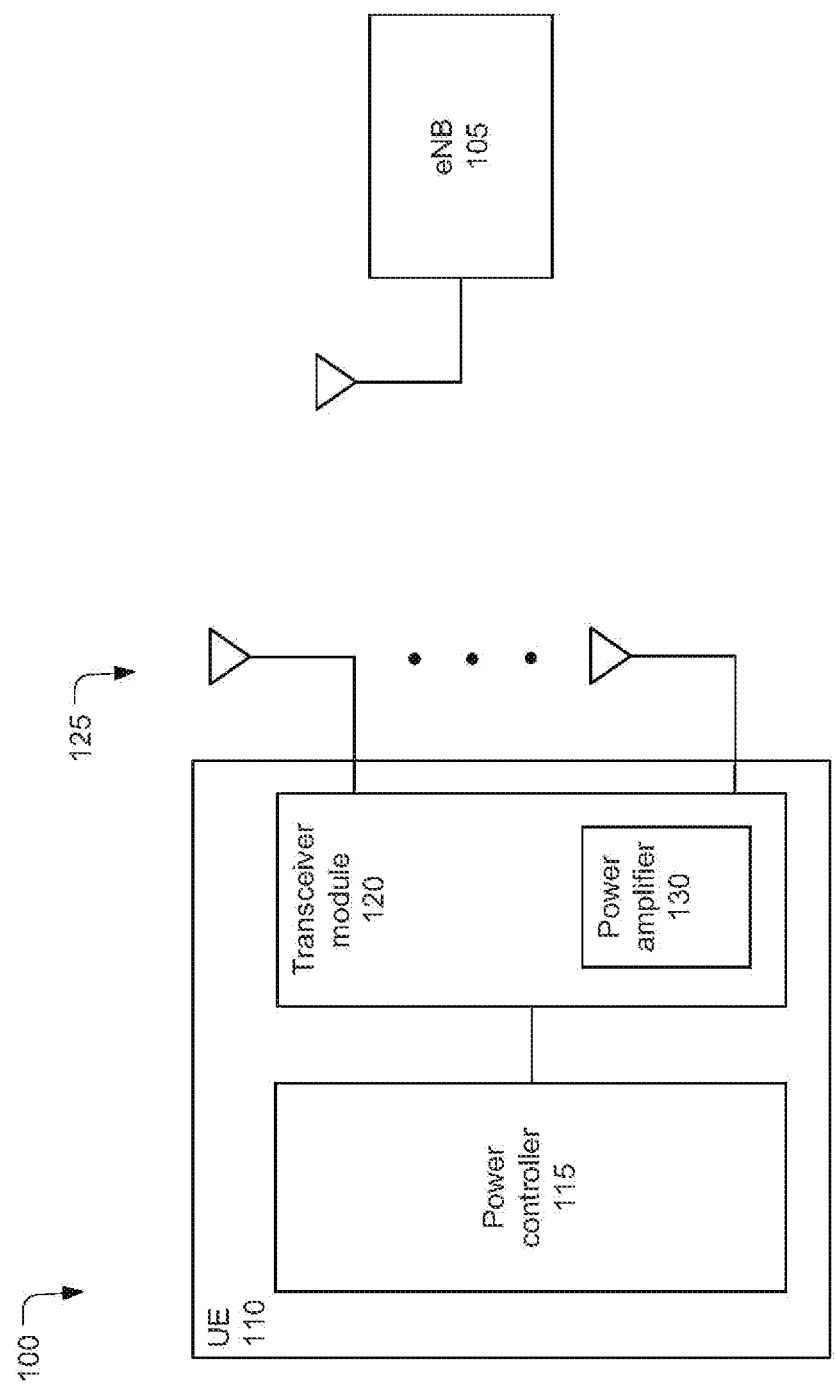

Figure 2-A

| | t | t+1 | t+2 |
|---|---|---|---|
| CC1 205 | PUCCH+PUSCH 220 | | PUCCH 225 |
| CC2 210 | PUSCH 230 | | PRACH 235 |
| CC3 215 | PRACH 240 | | PUSCH 245 |

Figure 2-B

| | t | t+1 | t+2 |
|---|---|---|---|
| CC1 205 | PUCCH + PUSCH 220 | | PUCCH 225 |
| CC2 210 | PUSCH 230 | | PRACH 235 |
| CC3 250 | PUSCH 255 | | PRACH 260 |

MULTI-CHANNEL POWER CONTROL

FIELD

Embodiments of the present invention relate generally to the technical field of wireless networking and, in particular, to power control of different carriers in a carrier aggregated uplink transmission.

BACKGROUND

Carrier Aggregation ("CA") is a major topic in the development of the current Third Generation Partnership Project ("3GPP") Long Term Evolution ("LTE") standard. Radio bandwidth is a limited resource, because there is a limited spectrum that can be used for LTE communications. However, CA allows for the effective bandwidth to be expanded because the bandwidth can be subdivided into multiple component carriers. A user can concurrently use multiple carriers to transmit a channel, which increases the overall bandwidth that the channel is being transmitted on.

A significant problem with CA is how power allocation is handled between multiple carriers. A single user device ("UE") only has a set amount of power that it can use to transmit due to limitations of the power amplifier on the UE, and that power must be allocated between the multiple carriers. For example, if multiple carriers are transmitting the physical random access channel ("PRACH"), or if carriers are transmitting the PRACH at substantially the same time as the physical uplink shared channel ("PUSCH"), the physical uplink control channel, ("PUCCH"), or the sounding reference signal ("SRS"), then the UE must divide the available power from the power amplifier between the different carriers and channels.

In certain instances, different channels may have different priorities. For example, the PRACH may have a lower priority than the PUSCH, PUCCH, SRS, because the information on the PRACH is less important than one of the other channels. Therefore, a lower amount of power may be allocated to the PRACH than one of the other uplink channels. However, a low power on the PRACH may cause the PRACH to be dropped multiple times, which may significantly negatively impact the time synchronization between the UE and an enhanced node base station ("eNB").

BRIEF DESCRIPTION OF THE DRAWINGS

Embodiments call be readily understood by the following detailed description in conjunction with the accompanying drawing. To facilitate this description, like reference numerals designate like structural elements. Embodiments are illustrated by way of example and not by way of limitation in the figures of the accompanying drawings.

FIG. 1 schematically illustrates a high-level example of a network system comprising a UE and an eNB, in accordance with various embodiments.

FIG. 2-A illustrates an exemplary transmission in a carrier aggregation scenario, in accordance with various embodiments.

FIG. 2-B illustrates an alternative transmission in a carrier aggregation scenario, in accordance with various embodiments.

DETAILED DESCRIPTION

Figure 3:
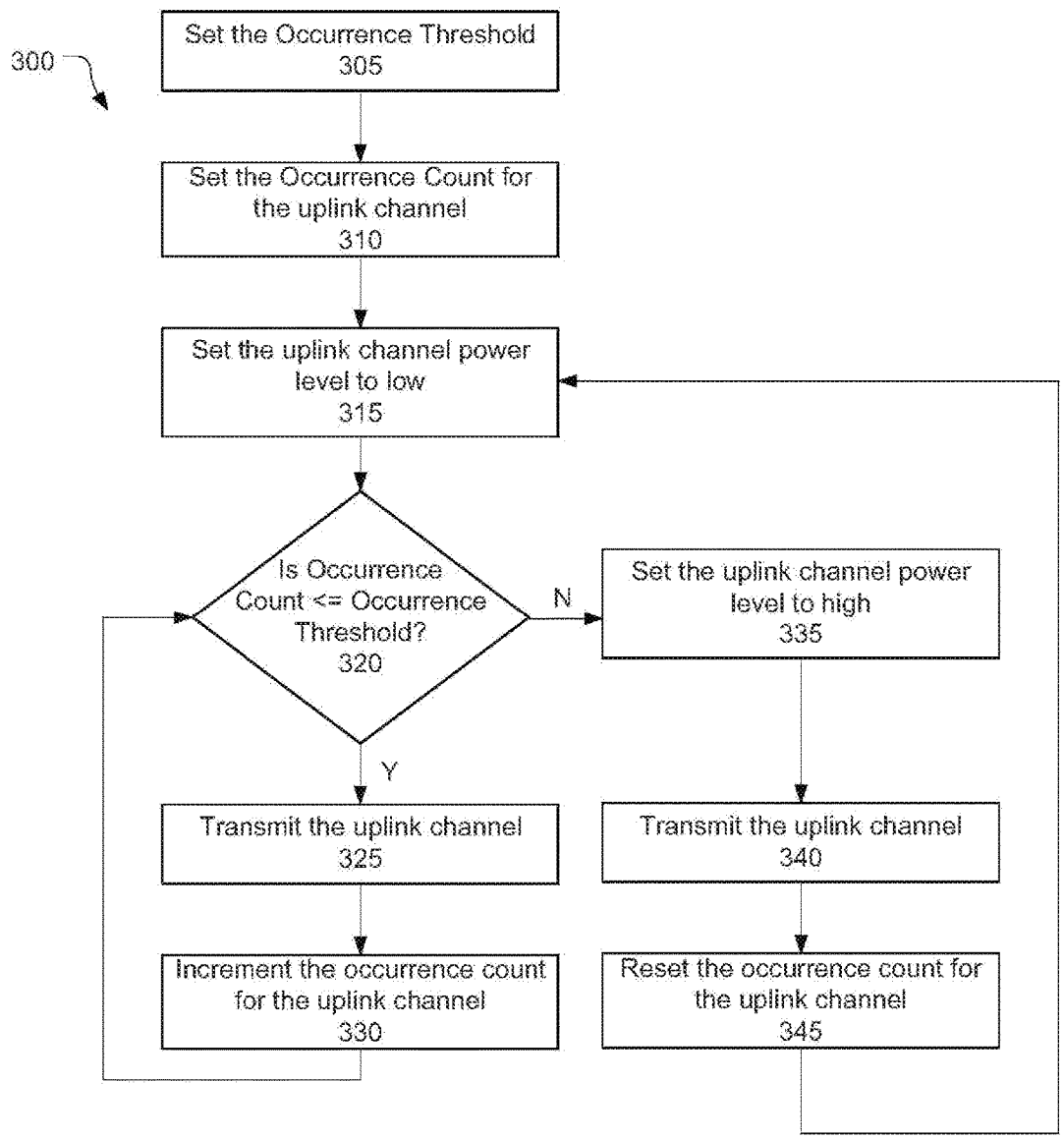
FIG. 3 depicts one method of setting uplink transmission power, in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

FIG. 1 schematically illustrates a wireless communication network 100 in accordance with various embodiments. Wireless communication network 100 (hereinafter "network 100") may be an access network of a 3GPP LTE network such as evolved universal terrestrial radio access network ("E-UTRAN"). The network 100 may include an eNB 105, configured to wirelessly communicate with a UP 110.

As shown in FIG. 1, the UE 110 may include power controller 115 coupled with transceiver module 120. The transceiver module 120 may be further coupled with one or more of a plurality of antennas 125 of the UP 110 for communicating wirelessly with other components of the network 100, e.g., eNB 105. The antennas 125 may be powered by a power amplifier 130. The power amplifier may be a component of the transceiver module 120, as shown in FIG. 1, or may be a separate component of the UE 110. In one embodiment, the power amplifier provides the power for all transmissions on the antennas 125. In other embodiments, there may be multiple power amplifiers on the UE 110.

In some embodiments, the UP 110 may be capable of utilizing CA in which a number of component carriers (CCs) are aggregated for communication between the eNB 105 and the UE 110. The transceiver module 120 may be configured to communicate with the eNB 105 via a plurality of serving cells utilizing a respective plurality of CCs. The CCs may be disposed in different bands or the same band.

FIG. 2-A shows an example of multi-carrier channel transmission 200 according to one embodiment of the invention. FIG. 2-A shows three CCs being configured for communications. Specifically, FIG. 2-A shows CC 1 205, CC 2 210, and CC 3 215. In this example, CC 1 205 can transmit the PUCCH and PUSCH channels during a first subframe 220 between time t and time t+1. CC 1 205 can then transmit the PUCCH channel 225 in a second subframe between time t+1 and time t+2.

Similarly, CC 2 can transmit the PUSCH channel in the first subframe 230 and the PRACH channel during the second subframe 235. CC 3 215 can transmit the PRACH channel during the first subframe 240, and the PUSCH channel during the second subframe 245.

FIG. 2-B shows an alternative example of multi-carrier transmission 201 according to another embodiment of the invention. In this example, CC1 205 and CC2 210 are identical between the first example of multi-earlier channel transmission 200 and the alternative example of multi-carrier transmission 201. The primary difference between the two embodiments 200 and 201 is that in the second embodiment 201, CC3 250 can transmit the PUSCH channel during a first subframe 255 and the PRACH channel during a second subframe 260.

One of ordinary in the art will recognize that the two examples of multi-carrier transmission 200 and 201 are merely exemplary, and that the PUCCH, PRACH and PUSCH channels may be split between CC1 205, CC2 210 and CC3 215,250 in different ways without departing from the spirit and scope of the present disclosure. Additionally, more or less CCs may be used in the CA transmission.

In an alternative embodiment, the different CCs may not be aligned in time and therefore the different subframes may not start or end simultaneously between CCs. As an example, CC2 210 may be shifted earlier or later in time than what is shown in FIG. 2-A. This time shift may cause at least part of the PRACH transmission 235 in CC2 to overlap in time the PRACH transmission 240 of CC3 215. Alternatively, time shift may cause at least part of the PUSCH transmission 230 in CC2 210 to overlap in time the PUSCH transmission 245 of CC3 215.

FIG. 3 displays one method of determining the power level of an uplink channel 300 transmitted from a UE. In one embodiment, the uplink channel can be the PRACH, however in other embodiments the uplink channel may be the PUSCH, PUCCH, SRS, or some other uplink channel. For the purposes of the following discussion, the actor will be generally stated as the UE, however it will be recognized that the method may be performed on a processor, a microprocessor, a chipset, a power amplifier, a power controller, or some other hardware on a UE. The method may be programmed into the hardware, firmware, or software of the UE in either temporary or permanent storage. Alternatively, the method may be saved on some permanent or temporary storage device outside of the and transmitted to the UE.

Initially, the UE determines an Occurrence Threshold 305 for the channel. The UE next sets the Occurrence Count for the channel 310, and sets the initial power for the transmission of the channel to a low value 315. The UE may set the low value 315 by sending an instruction to a power controller, a power amplifier, the transceiver, or some other component of the UR. The low value may be a minimal transmission power allowed by the UE, or some other power.

The UE then compares the Occurrence Count to the Occurrence Threshold 320. In one embodiment, the UE compares the Occurrence Count to the Occurrence Threshold to determine whether the Occurrence Count is less than or equal to the Occurrence Threshold. In other embodiments, the UE can compare the Occurrence Count to the Occurrence Threshold to determine whether the Occurrence Count is greater than or equal to the Occurrence Threshold, or some other factor of the Occurrence Threshold such multiplicative or logarithmic value of the Occurrence Threshold. This comparison can take place in a microprocessor or controller of the UE, or in some other UE component.

According to the current embodiment 300, if the Occurrence Count is less than or equal to the Occurrence Threshold, as determined in the comparison step 320, then the UE transmits the uplink channel at the pre-set low power value 325 via a transmitter or transceiver, and increments the Occurrence Count 330. The UE then returns to the comparison step 320.

If the UE determines in the comparison step 320 that the Occurrence Count is greater than the Occurrence Threshold, then the UE changes the power of the uplink channel to a high power level 335 that is equal to a desired power level of the uplink channel. This setting of the power level can occur via an instruction to a transmitter or transceiver, a power controller, a power amplifier, or some other component of the UE. The high power level may be the maximum transmission power available to the UE from the power amplifier. In another embodiment, the high power level may be some other power level that is higher than the low power level set in step 315.

Next, the UE transmits the uplink channel at the high power level 340 and resets the Occurrence Count for the uplink channel 345. When the UE resets the Occurrence Count 345, the UE can set the value of the Occurrence Count to be "0", or in other embodiments the UE can set the value of the Occurrence Count to be some other value. The UE may then reset the uplink channel power level to low 315 and return to the comparison step 320.

One result of the power allocation method 300 described above is that if the uplink channel and another channel are being transmitted at least partially at the same time, one or the other of the two channels may not receive their desired power level, but instead may only receive whatever power remains from the available power. For example, assume that a first CC transmitting the PRACH is subject to the power allocation method 300. Assume also that the UE is transmitting another uplink channel such as the PUSCH on a second 22. If the CC transmitting the PRACH is set at a low power level according to step 315, then the UE may allocate power first to the transmission of the PUSCH, and then secondly to the PRACH. In this instance, the PRACH may not receive its desired power, and instead may only receive an actual power that is equal to the difference between the available power and the power allocated to the PUSCH.

Alternatively, if the CC transmitting the PRACH has a high power level from step 335, then the actual power of the PRACH may be equal to its desired power, and the CC transmitting the PUSCH may have an actual power that was less than its desired power.

The method 300 described with respect to FIG. 3 is described with respect to a channel that is only transmitted on a single CC. However, the method 300 could also be used in the situation where the channel is transmitted across multiple CCs.

As an illustrative example, the method 300 could be applied to the exemplary embodiment 201 of FIG. 2-B where the PRACH 235 is transmitted on CC2 210 concurrently in time with the PRACH 260 on CC3 250. In this embodiment, both of the PRACH transmissions could each be assigned an Occurrence Count 310. Power assignment, such as the setting the uplink channel low power level 315 or setting the uplink channel high power level 335, could be based on the Occurrence Count for each CC. The CC with the higher Occurrence Count could receive a power assignment before the CC with the lower Occurrence Count. CCs determined in the comparing step 320 to have an Occurrence Count greater than the Occurrence Threshold would receive a high power allocation based on their Occurrence Count and be transmitted 340 by the UE. Then, transmissions on other channels would receive a power allocation, and finally CCs with an Occurrence Count lower than the Occurrence Threshold would be transmitted on the uplink channel 325 with a low power value.

Figure 4:
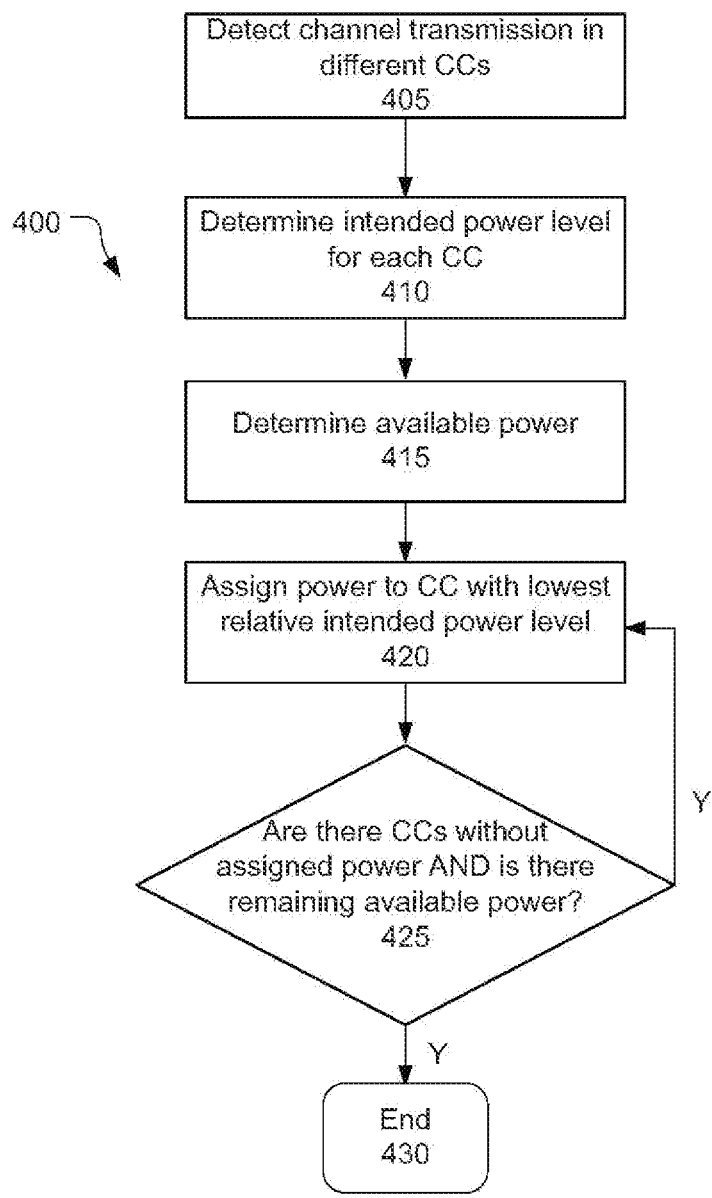
FIG. 4 schematically depicts an alternative method for setting uplink transmission power, in accordance with various embodiments.

FIG. 4 depicts an alternative embodiment of a method 400 for setting power control when multiple CCs are transmitting the same channel at least partially at the same time. As discussed above, this could occur as shown in FIG. 2-B when CC2 210 is transmitting the PUSCH 230 concurrently with CC3 250 transmitting the PUSCH 255. Alternatively, this could occur in the case of FIG. 2-A if CC2 210 and CC3 215 were not time aligned. In this instance the PRAM 235 on CC2 could at least partially overlap the PRACH 240 on CC3 215, or the PUSCH 230 on CC2 210 could at least partially overlap the PUSCH 245 on CC3 215.

As described earlier with respect to FIG. 3, the actor will be generally stated as the UE, however it will be recognized that the method may be performed on or otherwise involve a processor, a microprocessor, a chipset, or a power controller, or some other hardware on a UE. The method may be programmed into the hardware, firmware, or software of the UE in either temporary or permanent storage. Alternatively, the method may be saved on some permanent or temporary storage device outside of the UE and transmitted to the UE.

In this embodiment, the UE detects 405 that the same channel is to be transmitted at least partially at the same time on different CCs. The UE then determines 410 the intended power level for the channel transmission on each CC, and the UE also determines 420 the available power for the uplink transmission of the channel.

The UE can then assign power levels to the transmission of the channel on each CC. This power assignment can be performed by or involve a power amplifier, a power controller, a microprocessor, or some other UE component. In this embodiment of the method 400, the UE assigns the power levels to each CC according to the lowest relative intended power levels of each CC 420. The lowest relative intended power level is the intended power level that is lowest of the intended power levels of each of the CCs.

Specifically, the UE determines which CC has the lowest relative intended power level. The UE assigns an actual power level to the CC with the lowest relative intended power level that is equal to that CC's intended power level. The UE then determines 425 whether there are remaining CCs that are transmitting the channel and do not have an actual power level assigned to them, and also whether there is remaining available power. If the UE has remaining available power, then the UE can return to the power assignment step 420 and assign an actual power to the CC with the next lowest intended power level.

This process of power assignment 420 and power comparison 425 can continue until either there are no remaining CCs that do not have an actual power level, or there is no remaining available power. At this point, the process ends 430.

By way of illustration, the following example may clarify the discussion of the embodiment of the method 400 shown in FIG. 4. Assume, for the purposes of this example only, that the UE has an available power for a PUSCH transmission of 10 db. Assume also, for the purposes of this simple illustration only, that power is measured on a linear scale and is not algorithmic. Finally, assume that the UE is attempting to transmit the PUSCH on two CCs, CC1 and CC2. CC1 has an intended power of 7 dB, and CC2 has an intended power of 5 dB.

The UP could first determine that CC2 has the lowest relative intended power level, because CC2 has an intended power level of 5 dB. After determining that CC2 has the lowest relative intended power level, the UE could assign an actual power level to CC2 of 5 dB. The UE could then return to the power comparison step 425 to determine whether there are remaining CCs that do not have an actual power assigned, and whether there is remaining available power. In this instance, the UE could determine that CC1 does not have an actual power level, and also that there is 5 dB of remaining available power. In one embodiment, the UE could assign CC1 an actual power of 5 dB, which is the difference between the actual power of CC2 and the remaining available power. In another embodiment, the UE could assign CC1 an actual power of 0 dB.

In the example above, if the available power was 15 dB, then the actual power of CC1 and CC2 could be equal to their respective intended power. The above described example is intended merely to aid in the understanding of the embodiment of the method 400 described in FIG. 4. One of ordinary skill in the art will understand that a different power assignment could occur if the intended power was less than the available power. Additionally, more CC's could be contemplated for the described method 400, and the described method 400 could be applied to the PUSCH, PUCCH, PRACH, SRS, or some other uplink channel. Finally, power could be measured according to a different scale such as a logarithmic or exponential scale.

Figure 5:
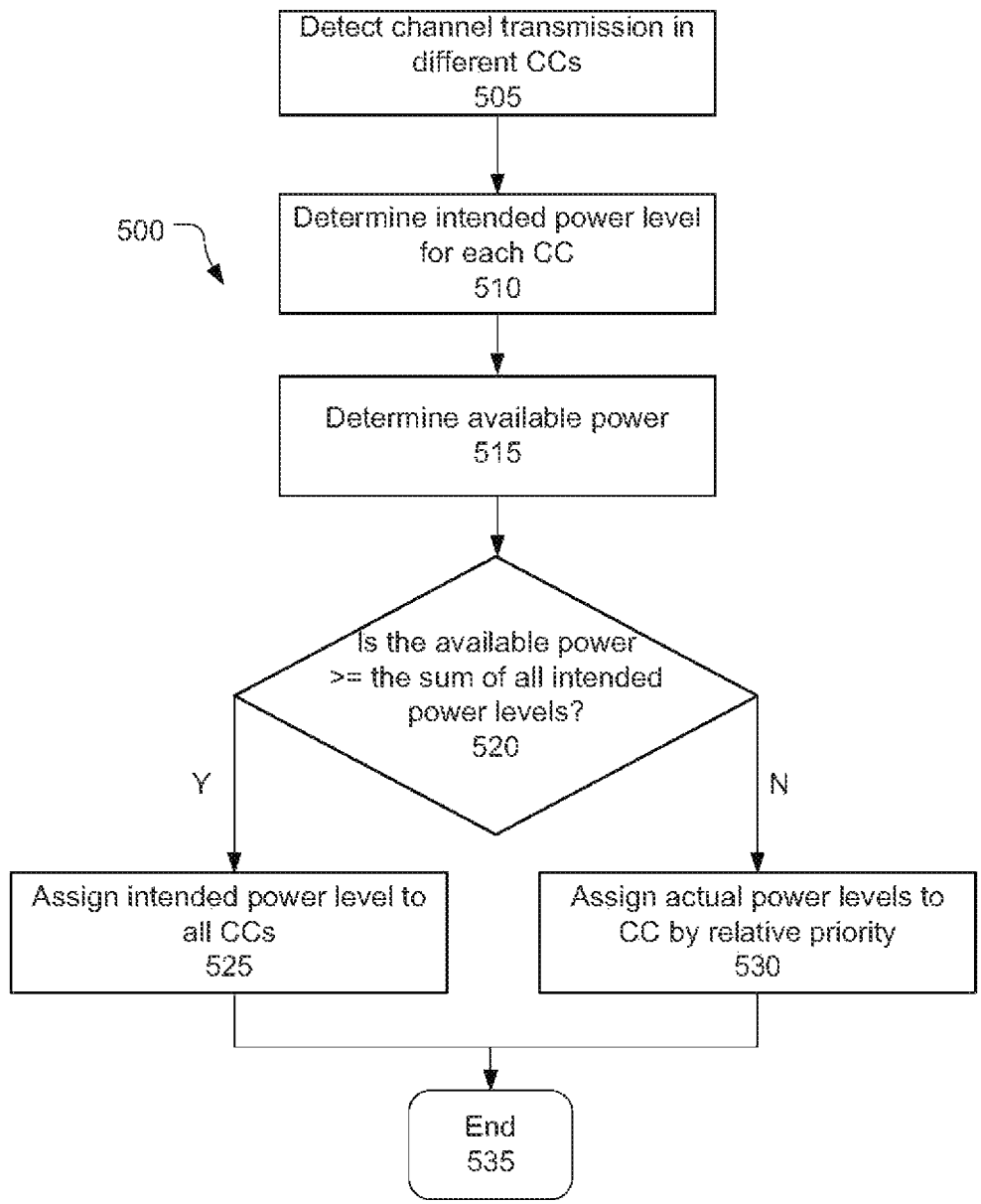
FIG. 5 depicts another alternative method for setting uplink transmission power in accordance with various embodiments.

FIG. 5 depicts an alternative embodiment of a method 500 for setting power control when multiple CCs are transmitting the same channel at least partially at the same time.

As described earlier with respect to FIG. 3, the actor will be generally stated as the UE, however it will be recognized that the method may be performed on or otherwise involve a processor, a microprocessor, a chipset, or a power controller, a power amplifier, or some other component of a UE. The method may be programmed into the hardware, firmware, or software of the UE in either temporary or permanent storage. Alternatively, the method may be saved on some permanent or temporary storage device outside of the UE and transmitted to the UE.

Similarly to the method 400 depicted in FIG. 4, the UE can detect 505 that multiple CCs are attempting to transmit a channel at least partially at the same time. The UE can then determine 510 the intended power level for each CC, and also determine 515 the power available for transmission.

The UE can compare 520 the sum of the intended power levels for each of the CCs against the available power level. In one embodiment, the comparison 520 can be based on determining whether the available power level is greater than or equal to the sum of the intended power levels. In another embodiment, the comparison 520 can be based on determining whether the available power level is greater than the sum of the intended power. In yet other embodiments, the comparison 520 can be based on determining whether the available power level is less than, less than or equal to, or some other factor of the sum of the intended power levels.

In the specific embodiment of the method 500 shown in FIG. 5, the comparison 520 is based on the UE determining whether the available power is greater than or equal to the sum of the intended power levels. If the available power level is determined to be greater than or equal to the sum of the intended power levels of each of the CCs, then the UE can assign 525 an actual power level to each CC that is equal to that CC's intended power level.

If the comparison 520 indicates that the available power level is not greater than or equal to the sum of the intended power levels, then the UE can assign 530 an actual power level to each CC based on relative priority.

In one embodiment, relative priority can be based on an equation such as:

$$CC\_Actual\_Power = \frac{sum(All\_Intended\_Power) - CC\_Intended\_Power}{sum(All\_Intended\_Power)} \times CC\_Intended\_Power \quad \text{Equation 1}$$

where CC_Actual_Power is the Actual Power assigned to the given CC, CC_Intended_Power is the intended power of the given CC, and sum(All_Intended_Power) is the sum of the intended power for each of the CCs transmitting the channel.

One of ordinary skill in the art will recognize that Equation 1 can have the result that a CC is scaled according to the intended power of that CC. In other words, the higher the intended power of the CC, the more the actual power of the CC differs from the intended power.

Equation 1 is merely exemplary, and other relative power assignments may be used according to the current embodiment where the actual power is assigned based on some comparison of the intended factors with the available power. For example, an alternative version of Equation 1 with more or less factors could be used without departing from the spirit and scope of the present disclosure.

After the actual power for each CC is determined, the method 500 of the embodiment of FIG. 5 can end 535.

Figure 6:
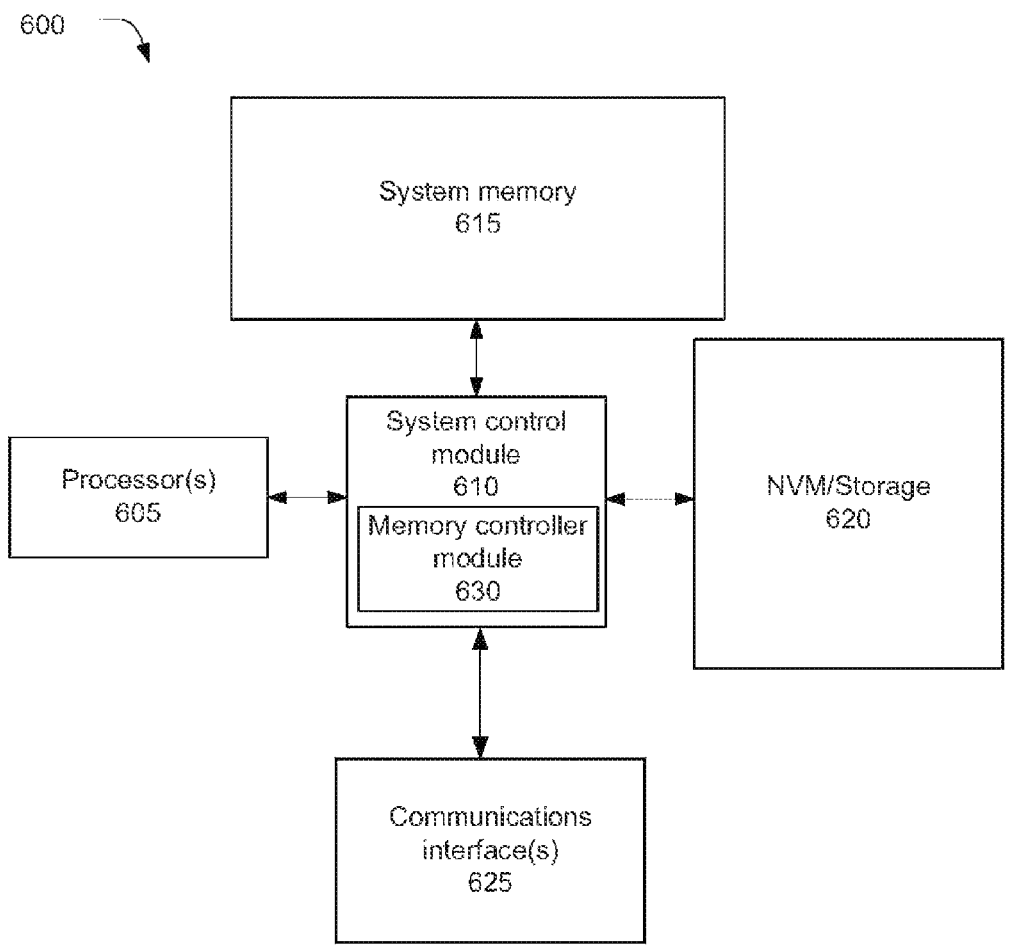
FIG. 6 schematically illustrates an example system that may be used to practice various embodiments described herein.

Embodiments of the present disclosure may be implemented into a system using any suitable hardware and/or software configure as desired. FIG. 6 schematically illustrates an example system 600 that may be used to practice various embodiments described herein. FIG. 6 illustrates, for one embodiment, an example system 600 having one or more processor(s) 605, system control module 610 coupled to at least one of the processor(s) 605, system memory 615 coupled to system control module 610, non-volatile memory (NVM)/storage 620 coupled to system control module 610, and one or more communications interface(s) 625 coupled to system control module 610.

In some embodiments, the system 600 may be capable of functioning as the UE 110 as described herein. In other embodiments, the system 600 may be capable of functioning as the eNB 105 depicted in the embodiment shown in FIG. 1 or any one of the other described embodiments. In some embodiments the system 600 may include one or more computer-readable media (e.g., system memory or NVM/storage 620) having instructions and one or more processors (e.g., processor(s) 605) coupled with the one or more computer-readable media and configured to execute the instructions to implement a module to perform actions described herein.

System control module 610 for one embodiment may include any suitable interface controllers to provide for any suitable interface to at least one of the processor(s) 605 and/or to any suitable device or component in communication with system control module 610.

System control module 610 may include memory controller module 630 to provide an interface to system memory 615. The memory controller module 630 may be a hardware module, a software module, and/or a firmware module.

System memory 615 may be used to load and store data and/or instructions, for example, for system 600. System memory 615 for one embodiment may include any suitable volatile memory, such as suitable DRAM, for example. In some embodiments, the system memory 615 may include double data rate type four synchronous dynamic random-access memory (DDR4 SDRAM).

System control module 610 for one embodiment may include one or more input/output (I/O) controller(s) to provide an interface to NVM/storage 620 and communications interface(s) 625.

The NVM/storage 620 may be used to store data and/or instructions, for example. NVM/storage 620 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 620 may include a storage resource physically part of a device on which the system 600 is installed or it may be accessible by, but not necessarily a part of, the device. For example, the NVM/storage 620 may be accessed over a network via the communications interface(s) 625.

Communications interface(s) 625 may provide an interface for system 600 to communicate over one or more network(s) and/or with any other suitable device. The system 600 may wirelessly communicate with the one or more components of the wireless network in accordance with any of one or more wireless network standards and/or protocols.

For one embodiment, at least one of the processor(s) 605 may be packaged together with logic for one or more controller(s) of system control module 610, e.g., memory controller module 630. For one embodiment, at least one of the processor(s) 605 may be packaged together with logic for one or more controllers of system control module 610 to term a System in Package (SiP). For one embodiment, at least one of the processor(s) 605 may be integrated on the same die with logic for one or more controller(s) of system control module 610. For one embodiment, at least one of the processor(s) 605 may be integrated on the same die with logic for one or more controller(s) of system control module 610 to form a System on Chip (SoC).

In various embodiments, the system 600 may be, but is not limited to, a server, a workstation, a desktop computing device, or a mobile computing device (e.g., a laptop computing device, a handheld computing device, a tablet, a netbook, etc.). In various embodiments, the system 600 may have more or less components, and/or different architectures. For example, in some embodiments, the system 600 includes one or more of a camera, a keyboard, liquid crystal display (LCD) screen (including touch screen displays), non-volatile memory port, multiple antennas, graphics chip, application-specific integrated circuit (ASIC), and speakers.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g. first, second or third) for identified elements are used to distinguish between the elements, and do not indicate or imply a required or limited number of such elements, nor do they indicate a particular position or order of such elements unless otherwise specifically stated.

What is claimed is:

1. One or more non-transitory computer-readable media having instructions that, when executed by a processor of a mobile device, cause the mobile device to:
   set a power level of a transmission of a random access channel in the mobile device at a low value;
   set an occurrence threshold and an occurrence count for the random access channel, wherein the occurrence count and occurrence threshold related to a number of transmissions on the random access channel;
   increment the occurrence count when the mobile device transmits on the random access channel at the set power level;
   compare the occurrence count to the occurrence threshold; and
   set the power level of the random access channel transmission in the mobile device at a high value based on comparison of the occurrence count to the occurrence threshold.

2. The one or more non-transitory computer-readable media of claim 1 wherein the random access channel is a physical random access channel.

3. The one or more non-transitory computer-readable media of claim 1 wherein the random access channel is on a first carrier, and a second channel is on a second carrier.

4. The one or more non-transitory computer-readable media of claim 3 wherein the second channel is a physical uplink shared channel or a physical uplink control channel.

5. The one or more non-transitory computer-readable media of claim 3 wherein the random access channel and the second channel are powered by a single power amplifier of the mobile device.

6. The one or more non-transitory computer-readable media of claim 5 wherein the power amplifier has an available power level and the instructions, when executed, further cause the power amplifier, when the power level of the transmission is set at the low value, to:
   provide a first power level to transmissions of the second channel to fulfill a desired power allocation of the second channel; and
   provide a second power level to transmissions of the random access channel that is a difference between the first power level and the available power level.

7. The one or more non-transitory computer-readable media of claim 5 wherein the power amplifier has an available power level and the instructions, when executed, further cause the power amplifier, when the power level of the random access channel transmission is set at a high value, to:
   provide a first power level to transmissions of the random access channel to fulfill a desired power allocation of the random access channel; and
   provide a second power level to transmissions of the second channel that is a difference between the first power level and the available power level.

8. A mobile device comprising:
   a transmitter to transmit a first random access channel on a first carrier and a second random access channel on a second carrier;
   a processor to compare a first occurrence count to an occurrence threshold, wherein the occurrence count and occurrence threshold are related to a number of times a transmission has occurred at a low value on the first random access channel; and
   a power controller to set a power level of transmissions of the first random access channel on the first carrier at the low value, and change the power level of the transmissions of the first random access channel to a high value based on the comparison of the first occurrence count to the occurrence threshold.

9. The mobile device of claim 8 wherein the power level of the transmissions of the first random access channel is a first power level, and a power level of transmissions of the second random access channel is a second power level; and
   the processor is further to determine a second occurrence count for a transmission of the second random access channel and compare the second occurrence count to the occurrence threshold; and
   set the second power level at a low value and change the second power level to a high value based on the comparison of the second occurrence count to the occurrence threshold.

10. The mobile device of claim 9 wherein the first power level is higher than the second power level if the first occurrence count is higher than the second occurrence count.

11. The mobile device of claim 8 wherein the first random access channel is a physical random access channel.

12. The mobile device of claim 8 wherein the transmitter is further to transmit one or both of a physical uplink shared channel and a physical uplink control channel substantially simultaneously with the first random access channel.

13. The mobile device of claim 8 wherein the transmitter is to transmit the first random access channel substantially simultaneously with the second random access channel.

14. The mobile device of claim 8 wherein the processor is further to reset the first occurrence count to a minimal value based on a comparison of the first occurrence count to the occurrence threshold.

* * * * *